United States Patent [19]

Sheffer et al.

[11] 4,095,570
[45] Jun. 20, 1978

[54] ELECTRONIC ENGINE CONTROL SYSTEM AND METHOD OF OPERATION

[75] Inventors: Timothy K. Sheffer, Rochester; Donald D. Stoltman, Henrietta, both of N.Y.

[73] Assignee: General Motors Corporation, Detroit, Mich.

[21] Appl. No.: 717,283

[22] Filed: Aug. 24, 1976

[51] Int. Cl.² .................. F02B 3/00; F02M 7/00; F02B 33/00
[52] U.S. Cl. .................. 123/119 EC; 137/116.5; 60/276; 123/119 A; 123/119 F; 123/102
[58] Field of Search ............ 123/32 EE, 102, 119 EC, 123/103 R, 103 D, 119 A, 119 F; 60/276, 285; 137/116.5

[56] References Cited

U.S. PATENT DOCUMENTS

| | | | |
|---|---|---|---|
| 3,545,472 | 12/1970 | Franz | 137/116.5 |
| 3,685,502 | 8/1972 | Oberdorfer | 123/119 R |
| 3,715,006 | 2/1973 | Walsh | 123/102 |
| 3,800,764 | 4/1974 | Goto | 123/119 A |
| 3,896,913 | 7/1975 | Maruoka | 123/117 R |
| 3,934,565 | 1/1976 | Matsumoto | 123/119 F |
| 4,023,357 | 5/1977 | Masaki | 123/119 EC |
| 4,029,061 | 6/1977 | Asano | 123/32 EE |

Primary Examiner—Ronald B. Cox
Attorney, Agent, or Firm—C. K. Veenstra

[57] ABSTRACT

A system for positioning an engine control element has a sensor measuring a value corresponding to the actual position of the element, a reference providing a command value establishing the proper position for the element, an electronic control which compares the measured value with the command value, and an actuator including a fluid pressure responsive motor for moving the element and a pressure regulator directed by the electronic control to regulate the fluid pressure delivered to the motor and cause the motor to move the control element to the proper position. The pressure regulator has a coil energized by the electronic control and a valve member which floats between a regulated-pressure-reducing bias caused by the magnetic flux created in the coil and a regulated-pressure-increasing bias caused by a varying but uncontrolled pressure differential.

8 Claims, 6 Drawing Figures

ELECTRONIC ENGINE CONTROL SYSTEM AND METHOD OF OPERATION

This invention relates to an electronic engine control system and method of operation and, more particularly, to a system having and a method employing a practical actuator which cooperates with an electronic control to position an engine control element.

There are widely recognized potential advantages in a system having an electronic microprocessor programmed to provide a command value establishing the proper position for an engine control element under each combination of engine operating conditions. A system having such a microprocessor cannot be adopted, however, until a practical actuator is available to move the engine control element to the position established by the microprocessor. In such a system, the actuator must meet the usual criteria of minimum cost, complexity and space requirement and in addition must draw as little power and create as little heat as possible.

This invention provides an electronic engine control system employing an actuator which meets these criteria. In this system the actuator includes a fluid pressure responsive motor which moves the engine control element and a pressure regulator which is directed by an electronic control to regulate the fluid pressure delivered to the motor in the manner required to cause the motor to move the control element to the proper position.

A distinguishing feature of the actuator in this system, and a feature which provides numerous advantages, is a floating valve member which forms the moving component of the pressure regulator. The pressure regulator has a port sensing low pressure and a bleed sensing higher pressure, and the floating valve member regulates flow through the port and the bleed to form a regulated pressure for the fluid motor. A coil energized by the electronic control creates magnetic flux biasing the floating valve member to open the port and close the bleed and thus reduce the regulated pressure, while a pressure differential from one end to the opposite end of the floating valve member biases it to close the port and open the bleed and thus increase the regulated pressure. The electronic control varies the current through the coil, preferably by energizing the coil with an oscillating power supply having a variable duty cycle or pulse width, to vary the magnetic bias on the floating valve member, but the pressure bias on the floating valve member is entirely uncontrolled. Thus the floating valve member is not located as a fixed function of the duty cycle but instead is located by varying the duty cycle as required to counter the uncontrolled pressure bias.

This invention accordingly provides an electronic engine control system and method of operation which obviates both the need for precise calibration of the actuator to the electronic control and the need for compensation of the electronic control to avoid changes due to age or disturbances such as temperature or voltage fluctuations.

Moreover, in this system the actuator has a pressure regulator in which a floating valve member closes both the low pressure port and the higher pressure bleed when the control element is in the proper position.

This invention accordingly provides an electronic engine control system and method of operation which does not require continuous fluid flow through the port and/or the bleed during steady state operation and avoids the inefficiencies which would accompany a continuous flow requirement.

In a preferred embodiment, the actuator includes a pneumatic motor responsive to subatmospheric pressure and a pressure regulator which senses subatmospheric engine manifold pressure at the port and atmospheric pressure at the bleed to form the regulated pressure for the pneumatic motor. The additional advantages of this embodiment will be appreciated when it is realized that many engine control elements are usually positioned by a pneumatic motor responsive to manifold pressure and have a limit position as manifold pressure approaches atmospheric pressure — for in the event the electronic control were to continuously energize the pressure regulator coil, the floating valve member would open the manifold pressure port and close the atmospheric pressure bleed and the motor then would move the engine control element in accordance with variations in manifold pressure, while in the event the electronic control failed to energize the pressure regulator coil, the floating valve member would close the manifold pressure port and open the atmospheric pressure bleed and the motor then would move the engine control element to the limit position.

This invention accordingly provides an electronic engine control system and method of operation which permits at least limited engine operation despite improper functioning of the electronic control.

The details as well as other features and advantages of this invention are set forth in the remainder of the specification and are shown in the drawings in which.

Figure 1:
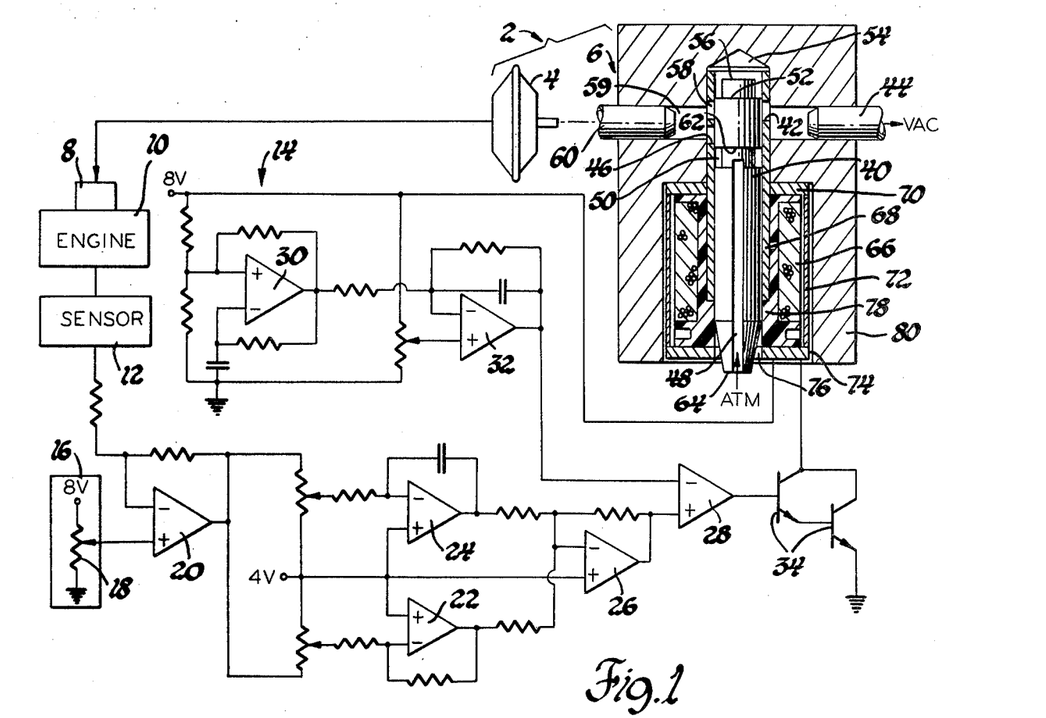
FIG. 1 is a schematic diagram of a preferred embodiment of this electronic engine control system, showing the details of the pressure regulator and the electronic control.

Referring first to FIG. 1, an actuator 2 (including a fluid pressure responsive motor 4 and a pressure regulator 6) positions a control element 8 on an engine 10. For purposes of illustration, engine 10 will be considered as an Otto-cycle internal combustion engine.

A sensor 12 measures a characteristic of operation of engine 10 — either the position of control element 8 or some other characteristic controlled by the position of element 8. For example, where element 8 is a carburetor metering rod, sensor 12 could measure the position of the metering rod or it could measure a characteristic such as the induction system air-fuel ratio, the partial pressure of oxygen in the exhaust gases, or the timing of peak combustion pressure, each of which is controlled by the position of the carburetor metering rod. Similarly, if element 8 were an exhaust gas recirculation valve, sensor 12 could measure the position of the valve or it could measure a characteristic such as the timing of peak combustion pressure which is controlled by the position of the exhaust gas recirculation valve. Also, if element 8 were a cold enrichment stop for a carburetor choke or other cold enrichment device, sensor 12 could measure the position of the stop or it could measure a characteristic such as the induction system air-fuel ratio, the exhaust gas oxygen content, or the timing of peak combustion pressure, each of which is controlled by the position of the cold enrichment stop during some modes of engine operation. Further, if element 8 were a valve controlling the flow of secondary air to the exhaust system, sensor 12 could measure the position of the valve or it could measure a characteristic such as the partial pressure of oxygen in the exhaust gases which is controlled by the position of such a valve. In addition, sensor 12 could measure engine idle speed which is controlled by the position of a throttle idle stop. Thus it will be appreciated that a variety of engine control elements — both those mentioned and others — may be positioned by actuator 2, and that numerous characteristics of operation of engine 10 — both those listed and others — could be measured by sensor 12, without departing from the scope of this invention.

Sensor 12 provides a measured value corresponding to the position of engine control element 8 to an electronic control 14. In addition, a reference 16 provides a command value establishing the proper position for element 8 to electronic control 14. While reference 16 is shown simply as a variable resistor 18, it is contemplated that reference 16 will in practice be the programmed memory of an electronic microprocessor which provides a command value under each combination of engine operating conditions, for example, under each combination of engine speed and induction passage manifold pressure.

Within electronic control 14, an amplifier 20 compares the measured value from sensor 12 with the command value from reference 16 and creates an error signal corresponding to the difference therebetween. The error signal is delivered through a circuit including an amplifier 22 to produce a quantity proportional to the error signal and a circuit including an amplifier 24 to produce a quantity proportional to the time integral of the error signal. The quantities produced by amplifiers 22 and 24 are summed and delivered through an amplifier 26 to an amplifier 28.

Electronic control 14 also includes an amplifier 30 which forms a portion of an oscillating power supply producing a 250 Hz square wave. The output of amplifier 30 is integrated through a circuit including an amplifier 32 to form a sawtooth wave which is delivered to amplifier 28. Amplifier 28 converts the sawtooth wave to a square wave having a pulse width controlled by the output of amplifier 26. This variable pulse width square wave is delivered from amplifier 28 through power transistors 34.

In the preferred embodiment, fluid pressure responsive motor 4 is a pneumatic motor which responds to a regulated subatmospheric pressure formed in pressure regulator 6. Pressure regulator 6 has a floating valve member 40 which regulates a port 42 sensing subatmospheric induction passage manifold pressure (VAC) through a fitting 44 and a bleed 46 sensing atmospheric pressure (ATM) through a slot or channel 48 formed in valve member 40 and an annular space 50 formed about valve member 40.

When floating valve member 40 moves toward the bottom of FIG. 1, a land 52 exposes port 42 to transmit the low manifold pressure from fitting 44 through port 42, a chamber 54 surrounding the end 56 of valve member 40, and an opening 58 to an outlet passage 59 which is connected through a fitting 60 to motor 4. When floating valve member 40 moves toward the top of FIG. 1, a land 62 of valve member 40 exposes bleed 46 to transmit the higher atmospheric pressure through channel 48, annular space 50, and bleed 46 to outlet passage 59.

It will be appreciated that floating valve member 40 has a pressure bias toward the top of FIG. 1 — to close port 42 and open bleed 46 and thus increase the regulated pressure in outlet passage 59 — because the biasing pressure in chamber 54 about the end 56 of valve chamber 40 varies between the regulated pressure in outlet passage 59 and the manifold pressure in port 42 and thus is less than the atmospheric pressure acting on the other end 64 of valve member 40. Floating valve member 40 also has a countering magnetic bias toward the bottom of FIG. 1 — to open port 42 and close bleed 46 and thus decrease the regulated pressure in outlet passage 59 — due to the magnetic flux created in a coil 66 which is energized by the variable pulse width square wave delivered through power transistors 34 of electronic control 14. Upon an increase in pulse width or duty cycle, the average current through coil 66 increases to increase the magnetic flux biasing valve member 40 toward the bottom of FIG. 1.

Floating valve member 40 slides in a sleeve 68 which contains port 42, bleed 46 and opening 58 and which forms a portion of the flux path for coil 66. The flux path is completed by a washer 70 contacting sleeve 68, an outer cylinder 72 contacting washer 70, and a washer 74 contacting cylinder 72 and forming an air gap 76 with valve member 40. Sleeve 68 is received in a spool 78 on which coil 66 is wound, and sleeve 68, spool 78 with coil 66, washer 70, cylinder 72 and washer 74 are formed as a subassembly and then supported in a housing 80 by sleeve 68. Additional support may be provided across the open end of housing 80 should that be desired.

In operation, reference 16 provides a command value establishing the proper position for control element 8. (The command valve may directly establish the proper position or it may establish the proper position by establishing the proper value for an engine operating characteristic controlled by the position of element 8.) At the same time, sensor 12 provides a measured value corresponding to the actual position of control element 8. (As discussed above, the sensor may directly measure the actual position or it may measure the actual position by measuring an actual engine operating characteristic controlled by the position of element 8.) If the command value exceeds the measured value, electronic control 14 increases the duty cycle of coil 66. The increased magnetic flux created in coil 66 then moves floating valve member 40 toward the bottom of FIG. 1 to expose port 42 and close bleed 46. Pressure regulator 6 thus reduces the regulated pressure delivered to motor 4, and motor 4 retracts control element 8 to the proper position established by reference 16.

Should the measured value from sensor 12 exceed the command value from reference 16, electronic control 14 reduces the duty cycle of coil 66. The magnetic flux created in coil 66 is thus reduced, and the pressure bias on valve member 40 moves valve member 40 toward the top of FIG. 1 to close port 42 and expose bleed 46. Pressure regulator 6 thus increases the regulated pressure delivered to motor 4, and motor 4 projects control element 8 to the proper position established by reference 16.

When the measured value from sensor 12 equals the command value from reference 16, electronic control 14 maintains a constant pulse width. The magnetic flux created in coil 66 which biases valve member 40 toward the bottom of FIG. 1 is then balanced by the pressure bias on valve member 40, and valve member 40 closes both port 42 and bleed 46 to maintain a constant regulated pressure in outlet passage 59. Accordingly, when control element 8 is in the proper position, there is no flow through pressure regulator 6.

Other advantages of pressure regulator 6 will be appreciated when it is understood that valve member 40 is not moved to a particular position under direct command of electronic control 14 but instead floats between a magnetic bias created by electronic control 14 and an uncontrolled pressure bias. Thus this system does not require calibration of actuator 2 with the duty cycle produced by electronic control 14 nor does it require compensation of electronic control 14 to avoid changes due to age or disturbances such as fluctuations in temperature, voltage, or other conditions of operation. If engine control element 8 is not in the position established by reference 16, electronic control 14 simply varies the duty cycle of coil 66 until control element 8 reaches the proper position and then maintains the duty cycle necessary to hold control element 8 in that position.

Figure 2:
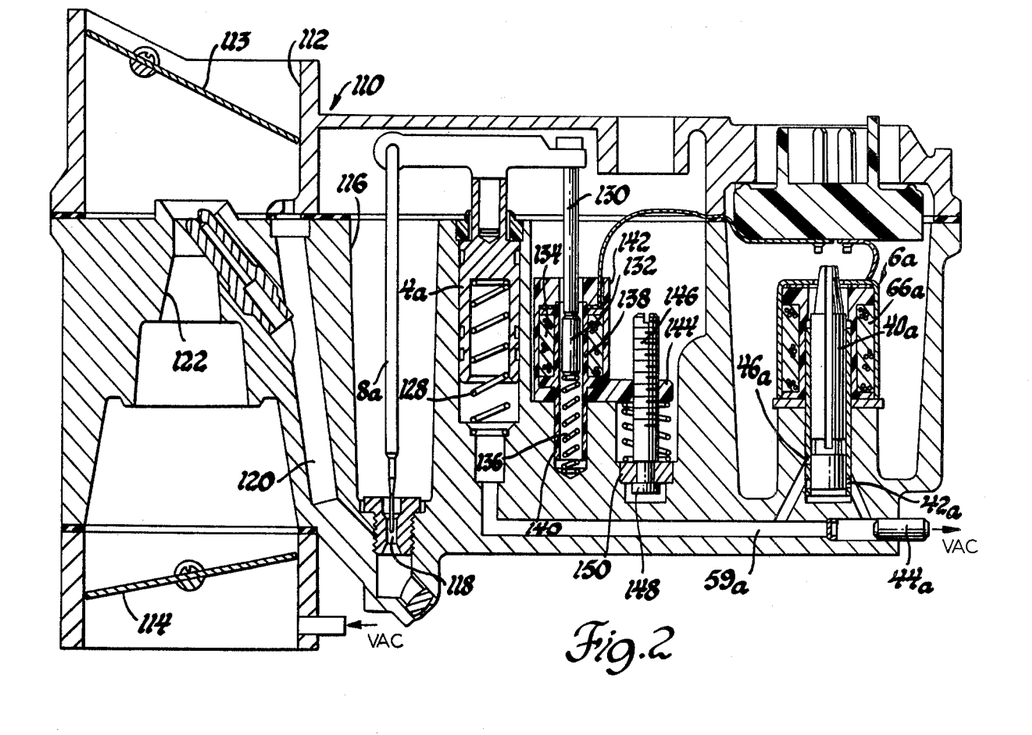
FIG. 2 illustrates an application of the FIG. 1 embodiment to control of a carburetor metering rod and is a schematic sectional elevational view of a carburetor containing the actuator together with a coil which senses the position of the metering rod.

FIG. 2 illustrates a particular application of this invention. Here, a carburetor 110 has an air induction passage 112 containing a choke 113 an a throttle 114. A fuel bowl 116 delivers fuel through a metering orifice 118 and a fuel passage 120 to a venturi cluster 122 disposed in induction passage 112; there the fuel is mixed with air flowing through induction passage 112. A metering rod 8a controls flow through metering orifice 118 to control the air-fuel ratio of the mixture in induction passage 112. Metering rod 8a is carried by a piston 4a which is biased upwardly by a spring 128 to lift metering rod 8a out of metering orifice 118, permitting increased fuel flow through orifice 118 and thus providing a relatively rich air-fuel mixture. Metering rod 8a corresponds to engine control element 8, and piston 4a together with spring 128 correspond to motor 4.

Piston 4a is subjected to a subatmospheric regulated pressure created by a pressure regulator 6a and delivered through an outlet passage 59a. The manifold pressure (VAC) in induction passage 112 downstream of throttle 114 is delivered to pressure regulator 6a through a fitting 44a. Pressure regulator 6a is similar in all important respects to pressure regulator 6 of FIG. 1, and the similar components have been identified with the same reference numerals followed by "a" to provide reference to the description of pressure regulator 6.

Although sensor 12 could measure induction passage air-fuel ratio, exhaust gas oxygen content or the timing of peak combustion pressure, each of which is controlled by the position of metering rod 8a, in this embodiment it is preferred to measure directly the position of metering rod 8a. For this purpose, piston 4a also carries a non-magnetic pin 130 which positions an armature 132 within a coil 134 against the bias of a spring 136. As a result, the inductance of coil 134 indicates the actual position of metering rod 8a.

Coil 134 is wound on a spool 138 having an extension 140 supported in carburetor 110. A molded cover 142 surrounds coil 134 and has an arm 144 receiving a threaded adjusting screw 146. The head 148 of adjusting screw 146 is trapped below a retainer 150 so that as adjusting screw 146 is turned, arm 144 of molded cover 142 raises or lowers coil 134 to provide initial calibration of the position and thus of the inductance of coil 134. It may be noted that coil 134 is surrounded by the epoxy or thermoplastic of cover 142 and the zinc of carburetor 110 and thus does not have a constrained flux path.

Figure 3:
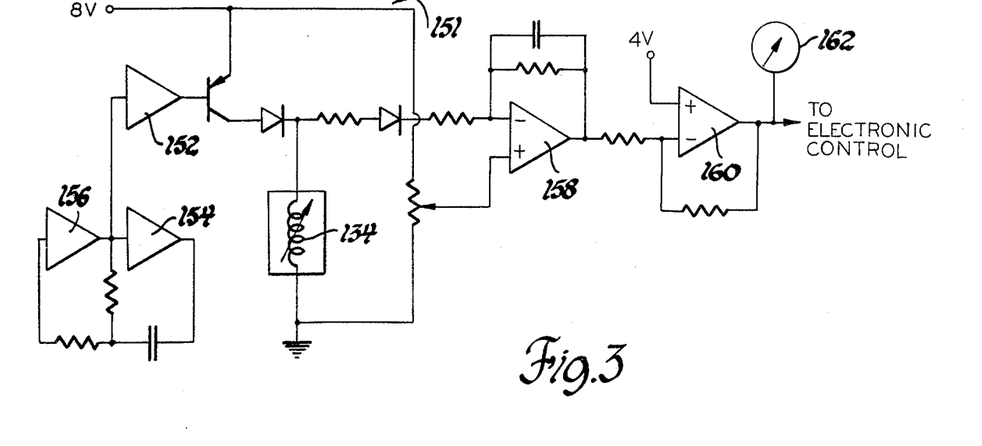
FIG. 3 is a schematic diagram of a sensor circuit which converts the variable inductance of the FIG. 2 position sensing coil to a valve measuring the actual position of the metering rod.

FIG. 3 illustrates one embodiment 151 of the circuits available to convert the variable inductance of coil 134 to a value which may be delivered to electronic control 14. Coil 134 is connected across the output of a 11 kHz square wave oscillator formed by amplifiers 152, 154 and 156 and thus converts the square wave to a wave having a varying decay rate. A circuit including an amplifier 158 integrates the resulting wave and delivers a value measuring the actual position of metering rod 8a through an amplifier 160 to electronic control 14 and, if desired, to a position meter 162.

In operation, coil 134, armature 132, and circuit 151 comprise a sensor 12a which provides a measured value corresponding to the position of metering rod 8a, and reference 16 provides a command value establishing a proper position for metering rod 8a. If the command value exceeds the measured value, electronic control 14 increases the duty cycle of coil 66a. The increased flux created in coil 66a then lifts floating valve member 40a to expose port 42a and close bleed 46a. Pressure regulator 6a thus reduces the pressure delivered to piston 4a, and piston 4a retracts metering rod 8a into orifice 118 to the leaner air-fuel ratio position established by reference 16.

Should the measured value from sensor 12a exceed the command value from reference 16, electronic control 14 reduces the duty cycle of coil 66a. The magnetic flux created in coil 66a is thus reduced, and the pressure bias (here acting together with a gravitational bias) on valve member 40a lowers valve member 40a to close port 42a and expose bleed 46a. Pressure regulator 6a thus increases the pressure delivered to piston 4a, and spring 128 lifts piston 4a to project metering rod 8a out of orifice 118 to the richer air-fuel ratio position established by reference 16.

When the measured value from sensor 12a equals the command value from reference 16, electronic control 14 maintains a constant pulse width. The magnetic flux created in coil 66a which biases valve member 40a upwardly is then balanced by the downward pressure bias on valve member 40a, and valve member 40a closes both port 42a and bleed 46a to maintain a constant regulated pressure in outlet passage 59a.

It will be appreciated that in the event electronic control 14 continuously energizes coil 66a, floating valve member 40a will open port 42a and close bleed 46a causing piston 4a to move metering rod 8a in accordance with variations in manifold pressure. Thus during low manifold pressure operating conditions piston 4a would retract metering rod 8a into metering orifice 118 to restrict fuel flow and provide a lean air-fuel ratio, and during high manifold pressure operating conditions spring 128 would lift piston 4a to project metering rod 8a out of orifice 118 to increase fuel flow and provide a rich air-fuel ratio. Moreover, should electronic control 14 fail to energize coil 66a, floating valve member 40a would close port 42a and open bleed 46a causing spring 128 to lift piston 4a and project metering rod 8a out of orifice 118 to the rich air-fuel ratio position. Thus engine 10 could be operated despite improper functioning of the electronic control.

Figure 4:
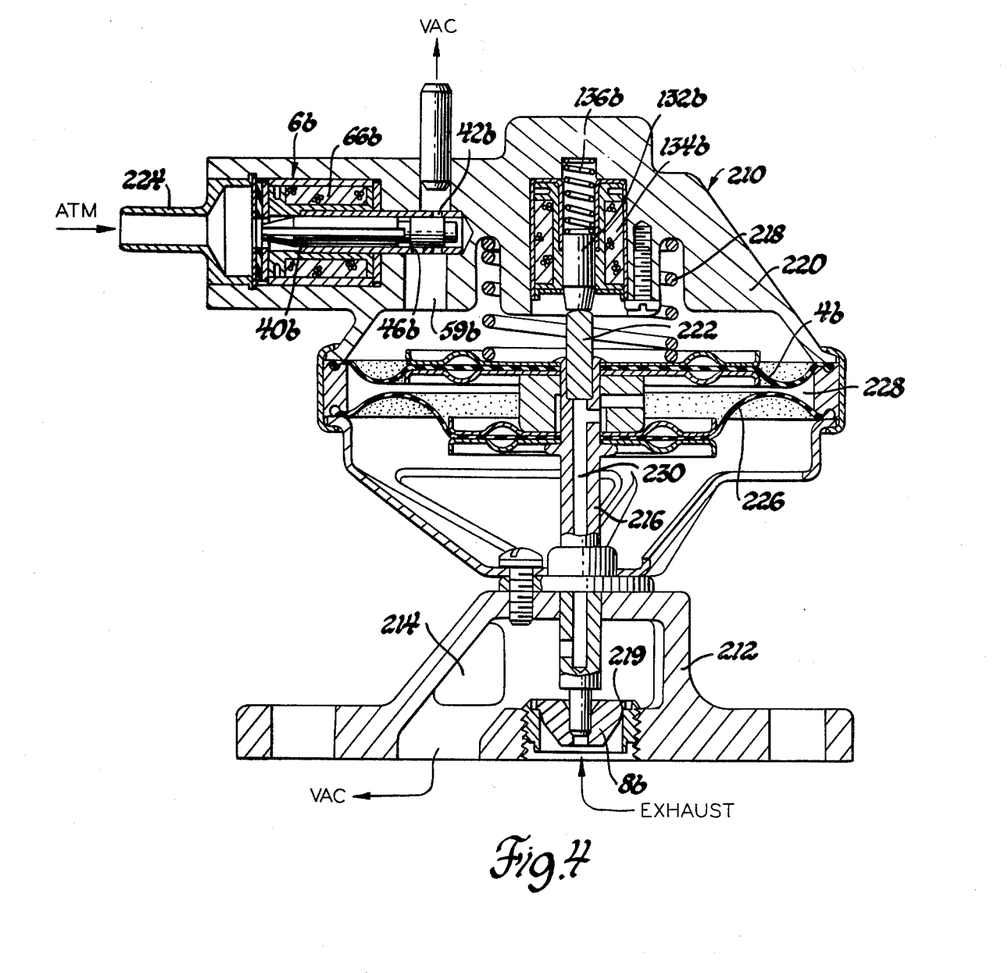
FIG. 4 illustrates an application of the FIG. 1 embodiment to control of an exhaust gas recirculation valve and is a sectional elevational view of an exhaust gas recirculation valve assembly containing the actuator together with a coil which senses the position of the exhaust gas recirculation valve.

FIG. 4 illustrates another application of this invention. Here, an exhaust gas recirculation (EGR) valve assembly 210 has a valve body 212 forming an EGR passage 214 to interconnect the engine exhaust passage with the engine air induction passage. An EGR valve 8b controls the flow of exhaust gases through EGR passage 214 and is positioned by a valve stem 216 secured to a diaphragm 4b. Diaphragm 4b is biased by a spring 218 to engage EGR valve 8b with a seat 219 and inhibit recirculation of exhaust gases through passage 214. EGR valve 8b corresponds to engine control element 8, and diaphragm 4b together with spring 218 correspond to motor 4.

The cover 220 for EGR valve assembly 210 incorporates a pressure regulator 6b which is similar in all important respects to pressure regulator 6 of FIG. 1, and the similar components have been identified with the same reference numerals followed by "b" to provide reference to the description of pressure regulator 6.

Cover 220 also includes a coil 134b containing an armature 132b biased by a spring 136b to engage a pin 222 carried by valve stem 216. The varying inductance of coil 134b is employed in circuit 151 of FIG. 3 to provide a value measuring the actual position of EGR valve 8b.

In operation, coil 134b, armature 132b, and circuit 151 comprise a sensor 12b which provides a measured value corresponding to the position of EGR valve 8b, and reference 16 provides a command value establishing a proper position for EGR valve 8b. If the command value exceeds the measured value, electronic control 14 increases the duty cycle of coil 66b. The increased flux created in coil 66b then moves floating valve member 40b to expose port 42b and close bleed 46b. Pressure regulator 6b thus reduces the pressure delivered to diaphragm 4b, and diaphragm 4b retracts EGR valve 8b away from seat 219 to the open, recirculation permitting, position established by reference 16.

Should the measured value from sensor 12b exceed the command value from reference 16, electronic control 14 reduces the duty cycle of coil 66b. The magnetic flux created in coil 66b is thus reduced, and the pressure bias on valve member 40b moves valve member 40b to close port 42b and expose bleed 46b. Pressure regulator 6b thus increases the pressure delivered to diaphragm 4b, and spring 218 lowers diaphragm 4b to project EGR valve 8b nearer seat 219 to the position established by reference 16.

When the measured value from sensor 12b equals the command value from reference 16, electronic control 14 maintains a constant pulse width. The magnetic flux created in coil 66b which biases valve member 40b leftwardly is then balanced by the rightward pressure bias on valve member 40b, and valve member 40b closes both port 42b and bleed 46b to maintain a constant regulated pressure in outlet passage 59b.

It will be appreciated that in the event electronic control 14 continuously energizes coil 66b, floating valve member 40b will open port 42b and close bleed 46b causing diaphragm 4b to move EGR valve 8b in accordance with variations in manifold pressure. Thus during low manifold pressure operating conditions diaphragm 4b would retract EGR valve 8b away from seat 219 to permit exhaust gas recirculation, and during high manifold pressure operating conditions spring 218 would cause diaphragm 4b to project EGR valve 8b toward seat 219 to inhibit exhaust gas recirculation. Moreover, should electronic control 14 fail to energize coil 66b, floating valve member 40b would close port 42b and open bleed 46b causing spring 218 to lower diaphragm 4b and engage EGR valve 8b with seat 219, thus inhibiting exhaust gas recirculation. Accordingly, engine 10 could be operated despite improper functioning of the electronic control.

A fitting 224 allows filtered air to be delivered to bleed 46b.

A second diaphragm 226 of smaller effective area than diaphragm 4b is disposed below diaphragm 4b, and the chamber 228 therebetween is exposed through a passage 230 formed in hollow valve stem 216 to the induction passage manifold pressure (VAC) in recirculation passage 214 downstream of EGR valve 8b. Diaphragm 226 assures that EGR valve 8b will close upon a sudden decrease in manifold pressure, such as may occur during sudden engine deceleration.

The remaining construction of exhaust gas recirculation valve assembly 210 is similar to that shown in U.S. Pat. Nos. 3,762,384 and 3,800,765.

Figure 5:
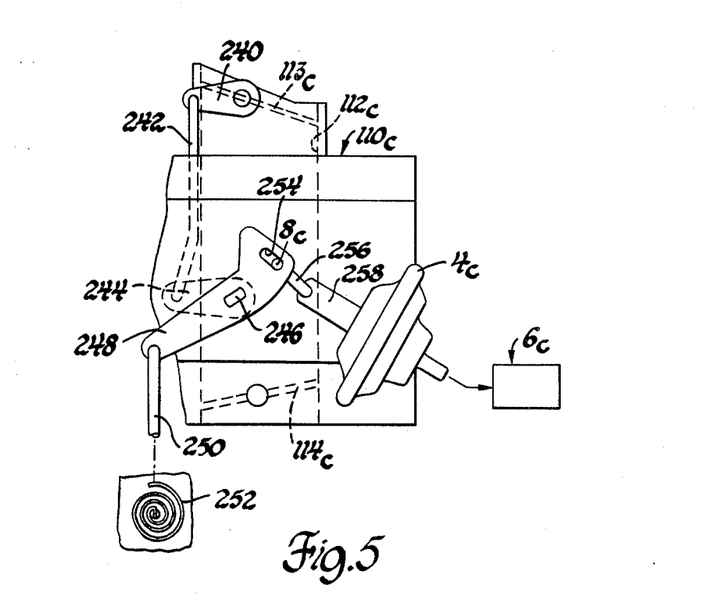
FIG. 5 illustrates an application of the FIG. 1 embodiment to control of a carburetor choke cold enrichment stop and is a schematic elevational view of a carburetor having a pneumatic motor positioning the stop.

FIG. 5 shows yet another application of this invention. Here, a carburetor 110c has an air induction passage 112c containing a choke 113c and a throttle 114c. Choke 113c serves in a conventional manner as a cold enrichment device to control the fuel supplied through carburetor 110c and thus control the air-fuel ratio in induction passage 112c. A choke lever 240 is secured to choke 113c and is connected through a choke link 242, an intermediate lever 244, in intermediate shaft 246, an operating lever 248, and a thermostat link 250 to a choke thermostat 252. Upon a decrease in temperature, thermostat 252 pulls downwardly on link 250 to increase the bias on choke 113c toward the closed position shown.

Operating lever 248 has a slot 254 containing the turned end 8c of a link 256 extending from the plunger 258 of a vacuum motor 4c. The end 8c of link 256 acts as a cold enrichment stop which limits movement of choke 113c toward the closed position. However, slot 254 allows lever 248 to move away from stop 8c, and thus choke 113c is free to move toward the open position as the force of air flow on choke 113c overcomes the force of thermostat 252. Cold enrichment stop 8c corresponds to engine control element 8, and vacuum motor 4c corresponds to motor 4.

A pressure regulator 6c, identical to pressure regulator 6 of FIG. 1, delivers a regulated subatmospheric pressure to vacuum motor 4c.

Vacuum motor 4c may contain a coil such as 134 or 134b having an armature such as 132 or 132b which operate with circuit 151 to form a sensor 12c providing a value measuring the actual position of cold enrichment stop 8c.

In operation, sensor 12c provides a measured value corresponding to the position of cold enrichment stop 8c, and reference 16 provides a command value establishing a proper position for stop 8c. If the command value exceeds the measured value, electronic control 14 increases the duty cycle of the pressure regulator coil. The increased flux created in the coil then moves the pressure regulator floating valve member to expose a manifold pressure port and close an atmospheric pressure bleed. Pressure regulator 6c thus reduces the pressure delivered to vacuum motor 4c, and vacuum motor 4c retracts stop 8c to the leaner air-fuel ratio position established by reference 16, limiting movement of choke 113c toward the closed position.

Should the measured value from sensor 12c exceed the command value from reference 16, electronic control 14 reduces the duty cycle of the pressure regulator coil. The magnetic flux created in the coil is thus reduced, and the pressure bias on the pressure regulator valve member moves the valve member to close the manifold pressure port and expose the atmospheric bleed. Pressure regulator 6c thus increases the pressure delivered to vacuum motor 4c, and vacuum motor 4c projects stop 8c to the richer air-fuel ratio position established by reference 16, permitting further movement of choke 113c toward the closed position.

When the measured value from sensor 12 equals the command value from reference 16, electronic control 14 maintains a constant pulse width. The magnetic flux created in the pressure regulator coil is then balanced by the pressure bias on the pressure regulator valve member, and the valve member closes both the manifold pressure port and the atmospheric pressure bleed to maintain a constant regulated pressure.

It will be appreciated that in the event electronic control 14 continuously energizes the pressure regulator coil, the floating valve member will open the manifold pressure port and close the atmospheric pressure bleed causing vacuum motor 4c to move stop 8c in accordance with variations in manifold pressure. Thus during low manifold pressure operating conditions vacuum motor 4c would retract stop 8c to provide a lean air-fuel ratio, and during high manifold pressure operating condition vacuum motor 4c would project stop 8c to permit a rich air-fuel ratio. Moreover, should electronic control 14 fail to energize the pressure regulator coil, the floating valve member would close the manifold pressure port and open the atmospheric pressure bleed causing vacuum motor 4c to project stop 8c to the rich air-fuel ratio position. Thus engine 10 could be operated despite improper functioning of the electronic control.

Figure 6:
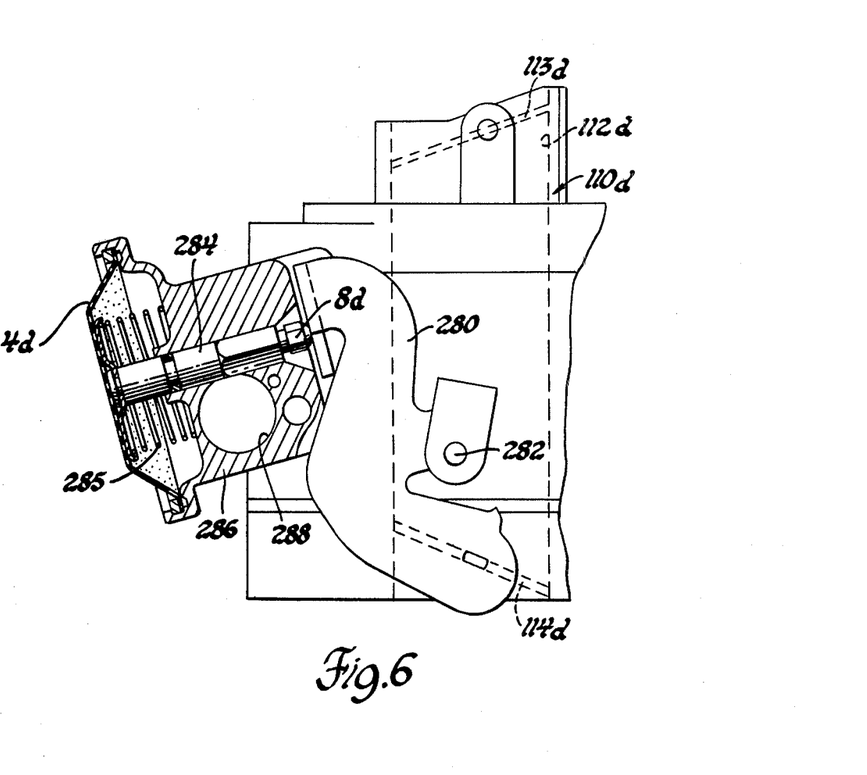
FIG. 6 illustrates an application of the FIG. 1 embodiment to control of a carburetor throttle idle stop and is a schematic elevational view of a carburetor having a pneumatic motor positioning the stop.

FIG. 6 illustrates a further application of this invention. Here, a carubretor 110d has an air induction passage 112d containing a choke 113d and a throttle 114d. A throttle lever 280 is secured to throttle 114d and has an arm 282 adapted for connection to the usual throttle linkage and throttle return spring. An idle stop 8d engages throttle lever 280 to limit movement of throttle 114d toward the closed position and thus control engine idle speed. Stop 8d is connected through a plunger 284 to a diaphragm 4d and is biased toward the closed throttle, low idle speed position by a spring 285. Idle stop 8d corresponds to control element 8, and diaphragm 4d together with spring 285 correspond to motor 4.

The housing 286 for diaphragm 4d has a recess 288 for receiving a pressure regulator 6d identical to pressure regulator 6b of FIG. 4.

In operation, sensor 12 provides a measured value corresponding to engine idle speed and thus corresponding to the position of idle stop 8d, and reference 16 provides a command value establishing proper engine idle speed and thus establishing a proper position for stop 8d. If the command value exceeds the measured value, electronic control 14 increases the duty cycle of the coil in pressure regulator 6d. The increased flux created in the coil then moves the floating valve member in pressure regulator 6d to expose a manifold pressure port and close an atmospheric pressure bleed. Pressure regulator 6d thus reduces the pressure delivered to diaphragm 4d, and diaphragm 4d retracts stop 8d to the high idle speed position established by reference 16.

Should the measured value from sensor 12 exceed the command value from reference 16, electronic control 14 reduces the duty cycle of the pressure regulator coil. The magnetic flux created in the coil is thus reduced, and the pressure bias on the pressure regulator valve member moves the valve member to close the manifold pressure port and expose the atmospheric pressure bleed. Pressure regulator 6d thus increases the pressure delivered to diaphragm 4d, and spring 285 projects stop 8d to the low idle speed position established by reference 16.

When the measured value from sensor 12 equals the command value from reference 16, electronic control 14 maintains a constant pulse width. The magnetic flux created in the pressure regulator coil is then balanced by the pressure bias on the pressure regulator valve member, and the valve member closes both the manifold pressure port and the atmospheric pressure bleed to maintain a constant regulated pressure.

It will be appreciated that in the event electronic control 14 continuously energizes the pressure regulator coil, the pressure regulator floating valve member will open the manifold pressure port and close the atmospheric pressure bleed causing diaphragm 4d to move stop 8d in accordance with variations in manifold pressure. Thus during low manifold pressure operating conditions diaphragm 4d would retract stop 8d to the high idle speed position, and during high manifold pressure operating condition diaphragm 4d would project stop 8d to the low idle speed position. Moreover, should electronic control 14 fail to energize the pressure regulator coil, the pressure regulator floating valve member would close the manifold pressure port and open the atmospheric pressure bleed causing spring 285 to project stop 8d to the low idle speed position. Thus engine 10 could be operated despite improper functioning of the electronic control.

The embodiments of the invention in which an exclusive property or privilege is claimed are defined as follows:

1. A system for positioning an engine control element comprising
    an actuator including a fluid motor responsive to a regulated pressure for moving said element toward a retracted position upon a decrease in said regulated pressure and toward a projected position upon an increase in said regulated pressure,
    said actuator also including a pressure regulator having a port adapted to sense low pressure, a bleed adapted to sense higher pressure, an outlet connected to said motor and combining said pressures to form said regulated pressure, a floating valve member regulating said port and said bleed, said valve member having one end exposed to said higher pressure and an opposite end exposed to a biasing pressure which varies between said low pressure and said regulated pressure and being biased by the difference between said higher pressure and said biasing pressure to close said port and open said bleed, and a coil surrounding said valve member for magnetically biasing said valve member to open said port and close said bleed, and an electronic control including means for increasing current through said coil to cause said valve member to open said port and close said bleed and thus reduce said regulated pressure when said element must be moved toward said retracted position, for decreasing current through said coil to cause said valve member to close said port and open said bleed and thus increase said regulated pressure when said element must be moved toward said projected position, and for maintaining sufficient current through said coil to balance the magnetic bias on said valve member with the pressure bias on said valve member and cause said valve member to close both said port and said bleed when said element must remain stationary.

2. The method of positioning an engine control element comprising the steps of moving the element toward a retracted position in response to a decrease in a regulated pressure and toward a projected position in response to an increase in the regulated pressure, sensing low pressure through a port and higher pressure through a bleed, regulating the port and the bleed with a floating valve member, and combining the pressures to form the regulated pressure, energizing a coil with an oscillating power supply having a variable pulse width, biasing the floating valve member in a port-opening and bleed-closing direction with the magnetic flux created in the coil and in a port-closing and a bleed-opening direction with a pressure differential created by exposing one end of said floating valve member to said higher pressure and by exposing the opposite end of said floating valve member to a biasing pressure which varies between said low pressure and said regulated pressure, measuring a value corresponding to the actual position of the element, providing a command value establishing the proper position for the element, and increasing the pulse width of the power supply to cause the valve member to open the port and close the bleed and thus reduce the regulated pressure when the element must be moved toward the retracted position to reduce the difference between the measured value and the command value, reducing the pulse width of the power supply to cause the valve member to close the port and open the bleed and thus increase the regulated pressure when the element must be moved toward the projected position to reduce the difference between the measured value and the command value, and maintaining the pulse width to balance the magnetic bias on the valve member with the pressure bias on the valve member to cause the valve member to close both the port and the bleed and thus maintain constant the regulated pressure when the measured value equals the command value.

3. A system for positioning a control element on an internal combustion engine having an air induction passage, said system comprising an actuator including a pneumatic motor responsive to a regulated pressure for moving said element toward a retracted position upon a decrease in said regulated pressure and toward a projected position upon an increase in said regulated pressure, said actuator also including a pressure regulator having a port sensing subatmospheric pressure created in said induction passage, a bleed sensing atmospheric pressure, an outlet connected to said motor and combining said pressure to form said regulated pressure, a floating valve member regulating said port and said bleed, said valve member having one end exposed to atmospheric pressure and an opposite end exposed to a biasing pressure which varies between said induction passage pressure and said regulated pressure and being biased by the difference between atmospheric pressure and said biasing pressure to close said port and open said bleed, and a coil surrounding said valve member for magnetically biasing said valve member to open said port and close said bleed, an electronic control including an oscillating power supply having a variable pulse width for energizing said coil, sensor means connected to said electronic control for providing a measured value corresponding to the actual position of said element, and reference means connected to said electronic control for providing a command value establishing the proper position for said element, said electronic control also including means for increasing said pulse width when said command value exceeds said measured value to cause said valve member to open said port and close said bleed and thus reduce said regulated pressure thereby causing said motor to move said element toward said retracted position and said measured value to approach said command value, for decreasing said pulse width when said measured value exceeds said command value to cause said valve member to close said port and open said bleed and thus increase said regulated pressure thereby causing said motor to move said element toward said projected position and said measured value to approach said command value, and for maintaining said pulse width to balance the magnetic bias on said valve member with the pressure bias on said valve member when said measured value equals said command value to cause said valve member to close both said port and said bleed and thus maintain constant said regulated pressure thereby causing said motor to hold said element stationary, whereby said valve member regulates said port and said bleed to form a regulated pressure causing said motor to move said element to the proper position established by said reference means.

4. In an internal combustion engine having an air induction passage, a throttle in said induction passage, a fuel passage, a metering orifice in said fuel passage, and a metering rod associated with said orifice: a system for positioning said metering rod to control fuel flow through said orifice and thus control the ratio of air flow through said induction passage to fuel flow through said fuel passage comprising an actuator including a pneumatic motor responsive to a regulated pressure for moving said metering rod into said orifice toward a lean air-fuel ratio position upon a decrease in said regulated pressure and out of said orifice toward a rich air-fuel ratio position upon an increase in said regulated pressure.

said actuator also including a pressure regulator having a port sensing the pressure in said induction passage downstream of said throttle, a bleed sensing atmospheric pressure, an outlet connected to said motor and combining said pressures to form said regulated pressure, a floating valve member regulating said port and said bleed, said valve member having one end exposed to atmospheric pressure and an opposite end exposed to a biasing pressure which varies between said induction passage pressure and said regulated pressure and being biased by the difference between atmospheric pressure and said biasing pressure to close said port and open said bleed, and a coil surrounding said valve member for magnetically biasing said valve member to open said port and close said bleed, an electronic control including an oscillating power supply having a variable pulse width for energizing said coil, sensor means connected to said electronic control for providing a value corresponding to the actual position of said metering rod, and reference means connected to said electronic control for providing a command value establishing the proper position for said metering rod, said electronic control also including means for increasing said pulse width when said command value exceeds said measured value to cause said valve member to open said port and close said bleed and thus reduce said regulated pressure thereby causing said motor to move said metering rod toward said lean air-fuel ratio position and said measured value to approach said command value, for decreasing said pulse width when said measured value exceeds said command value to cause said valve member to close said port and open said bleed and thus increase said regulated pressure thereby causing said motor to move said metering rod toward said rich air-fuel ratio position and said measured value to approach said command value, and for maintaining said pulse width to balance the magnetic bias on said valve member with the pressure bias on said valve member when said measured value equals said command value to cause said valve member to close both said port and said bleed and thus maintain constant said regulated pressure thereby causing said motor to hold said metering rod stationary, whereby said valve member regulates said port and said bleed to form a regulated pressure causing said motor to move said metering rod to the proper position established by said reference means during normal operation, whereby said valve member opens said port and closes said bleed to equalize said regulated pressure with said induction passage pressure causing said motor to move said metering rod in accordance with variations in said induction passage pressure in the event said power supply continuously energizes said coil, and whereby said valve member closes said port and opens said bleed to equalize said regulated pressure with atmospheric pressure causing said motor to move said metering rod to said rich air-fuel ratio position in the event said power supply fails to energize said coil.

5. In an internal combustion engine having an air induction passage, a throttle in said induction passage, an exhaust passage, a recirculation passage extending from said exhaust passage to said induction passage, and an exhaust gas recirculation valve in said recirculation passage: a system for positioning said exhaust gas recirculation valve to control the flow of exhaust gases through said recirculation passage comprising an actuator including a pneumatic motor responsive to a regulated pressure for moving said valve toward an open, recirculation permitting, position upon a decrease in said regulated pressure and toward a closed, recirculation inhibiting, position upon an increase in said regulated pressure, said actuator also including a pressure regulator having a port sensing the pressure in said induction passage downstream of said throttle, a bleed sensing atmospheric pressure, an outlet connected to said motor and combining said pressures to form said regulated pressure, a floating valve member regulating said port and said bleed, said valve member having one end exposed to atmospheric pressure and an opposite end exposed to a biasing pressure which varies between said induction passage pressure and said regulated pressure and being biased by the difference between atmospheric pressure and said biasing pressure to close said port and open said bleed, and a coil surrounding said valve member for magnetically biasing said valve member to open said port and close said bleed, an electronic control including an oscillating power supply having a variable pulse width for energizing said coil, sensor means connected to said electronic control for providing a value corresponding to the actual position of said exhaust gas recirculation valve, and reference means connected to said electronic control for providing a command value establishing the proper position for said exhaust gas recirculation valve, said electronic control also including means for increasing said pulse width when said command value exceeds said measured value to cause said valve member to open said port and close said bleed and thus reduce said regulated pressure thereby causing said motor to move said exhaust gas recirculation valve toward said open position and said measured value to approach said command value, for decreasing said pulse width when said measured value exceeds said command value to cause said valve member to close said port and open said bleed and thus increase said regulated pressure thereby causing said motor to move said exhaust gas recirculation valve toward said closed position and said measured value to approach said command value, and for maintaining said pulse width to balance the magnetic bias on said valve member with the pressure bias on said valve member when said measured value equals said command value to cause said valve member to close both said port and said bleed and thus maintain constant said regulated pressure thereby causing said motor to hold said exhaust gas recirculation valve stationary, whereby said valve member regulates said port and said bleed to form a regulated pressure causing said motor to move said exhaust gas recirculation valve to the proper position established by said reference means during normal operation, whereby said valve member opens said port and closes said bleed to equalize said regulated pressure with said low pressure causing said motor to move said exhaust gas recirculation valve in accordance with variations in said induction passage pressure in the event said power supply continuously energizes said coil, and whereby said valve member closes said port and opens said bleed to equalize said regulated pressure with said higher pressure causing said motor to move said exhaust gas recirculation valve to said recirculation inhibiting position in the event said power supply fails to energize said coil.

6. In an internal combustion engine having an air induction passage, a throttle in said induction passage, a fuel supply, cold enrichment means controlling said fuel supply, and an enrichment stop for said cold enrichment means: a system for positioning said stop to control the ratio of air flow through said induction passage to fuel flow through said fuel supply comprising an actuator including a pneumatic motor responsive to a regulated pressure for moving said stop toward a lean air-fuel ratio position upon a decrease in said regulated pressure and toward a rich air-fuel ratio position upon an increase in said regulated pressure, said actuator also including a pressure regulator having a port sensing the pressure in said induction passage downstream of said throttle, a bleed sensing atmospheric pressure, an outlet connected to said motor and combining said pressures to form said regulated pressure, a floating valve member regulating said port and said bleed, said valve member having one end exposed to atmospheric pressure and an opposite end exposed to a biasing pressure which varies between said induction passage pressure and said regulated pressure and being biased by the difference between atmospheric pressure and said biasing pressure to close said port and open said bleed, and a coil surrounding said valve member for magnetically biasing said valve member to open said port and close said bleed, an electronic control including an oscillating power supply having a variable pulse width energizing said coil, sensor means connected to said electronic control for providing a value corresponding to the actual position of said stop, and reference means connected to said electronic control for providing a command value establishing the proper position for said stop, said electronic control also including means for increasing said pulse width when said command value exceeds said measured value to cause said valve member to open said port and close said bleed and thus reduce said regulated pressure thereby causing said motor to move said stop toward said lean air-fuel ratio position and said measured value to approach said command value, for decreasing said pulse width when said measured value exceeds said command value to cause said valve member to close said port and open said bleed and thus increase said regulated pressure thereby causing said motor to move said stop toward said rich air-fuel ratio position and said measured value to approach said command value, and for maintaining said pulse width to balance the magnetic bias on said valve member with the pressure bias on said valve member when said measured value equals said command value to cause said valve member to close both said port and said bleed and thus maintain constant said regulated pressure thereby causing said motor to hold said stop stationary, whereby said valve member regulates said port and said bleed to form a regulated pressure causing said motor to move said stop to the proper position established by said reference means during normal operation, whereby said valve member opens said port and closes said bleed to equalize said regulated pressure with said induction passage pressure causing said motor to move said stop in accordance with variations in said induction passage pressure in the event said power supply continuously energizes said coil, and whereby said valve member closes said port and opens said bleed to equalize said regulated pressure with said higher pressure causing said motor to move said stop to said rich air-fuel ratio position in the event said power supply fails to energize said coil.

7. In an internal combustion engine having an air induction passage, a throttle in said induction passage, and an idle stop for said throttle: a system for positioning said stop to control engine idle speed comprising an actuator including a pneumatic motor responsive to a regulated pressure for moving said stop toward a high idle speed position upon a decrease in said regulated pressure and toward a low idle speed position upon an increase in said regulated pressure, said actuator also including a pressure regulator having a port sensing the pressure in said induction passage downstream of said throttle, a bleed sensing atmospheric pressure, an outlet connected to said motor and combining said pressures to form said regulated pressure, a floating valve member regulating said port and said bleed, said valve member having one end exposed to atmospheric pressure and an opposite end exposed to a biasing pressure which varies between said induction passage pressure and said regulated pressure and being biased by the difference between atmospheric pressure and said biasing pressure to close said port and open said bleed, and a coil surrounding said valve member for magnetically biasing said valve member to open said port and close said bleed, an electronic control including an oscillating power supply having a variable pulse width for energizing said coil, sensor means connected to said electronic control for providing a value measuring actual engine idle speed and thus corresponding to the actual position of said stop, and reference means connected to said electronic control for providing a command value establishing proper engine idle speed and thus establishing the proper position for said stop, said electronic control also including means for increasing said pulse width when said command value exceeds said measured value to cause said valve member to open said port and close said bleed and thus reduce said regulated pressure thereby causing said motor to move said stop toward said high idle speed position and said measured value to approach said command value, for decreasing said pulse width when said measured value exceeds said command value to cause said valve member to close said port and open said bleed and thus increase said regulated pressure thereby causing said motor to move said stop toward said low idle speed position and said measured value to approach said command value, and for maintaining said pulse width to balance the magnetic bias on said valve member with the pressure bias in said valve member when said measured value equals said command value to cause said valve member to close both said port and said bleed and thus maintain constant said regulated pressure thereby causing said motor to hold said stop stationary, whereby said valve member regulates said port and said bleed to form a regulated pressure causing said motor to move said stop to the proper position established by said reference means and thus to maintain the proper idle speed established by said reference means during normal operation, whereby said valve member opens said port and closes said bleed to equalize said regulated pressure with said induction passage pressure causing said motor to move said stop in accordance with variations in said induction passage pressure in the event said power supply continuously energizes said coil, and whereby said valve member closes said port and opens said bleed to equalize said regulated pressure with atmospheric pressure causing said motor to move said stop to said low idle speed position in the event said power supply fails to energize said coil.

8. A system for positioning a control element on an internal combustion engine having an air induction passage, said system comprising an actuator including a pneumatic motor responsive to a regulated pressure for moving said element toward a retracted position upon a decrease in said regulated pressure and toward a projected position upon an increase in said regulated pressure, said actuator also including a pressure regulator having a port sensing subatmospheric pressure created in said induction passage, a bleed sensing atmospheric pressure, an outlet connected to said motor and combining said pressures to form said regulated pressure, a floating valve member regulating said port and said bleed, and valve member having one end exposed to atmospheric pressure and an opposite end exposed to a biasing pressure which varies between said induction passage pressure and said regulated pressure and being biased by the difference between atmospheric pressure and said biasing pressure to close said port and open said bleed, and a coil surrounding said valve member for magnetically biasing said valve member to open said port and close said bleed, an electronic control including an oscillating power supply having a variable pulse width for energizing said coil, sensor means connected to said electronic control for providing a measured value corresponding to the actual position of said element, and reference means connected to said electronic control for providing a command value establishing the proper position for said element, said electronic control also including means for creating an error signal corresponding to the difference between said measured value and said command value and means responsive to the sum of quantities proportional to said error signals and to the time integral of said error signal for increasing said pulse width when said command value exceeds said measured value to cause said valve member to open said port and close said bleed and thus reduce said regulated pressure thereby causing said motor to move said element toward said retracted position and said measured value to approach said command value, for decreasing said pulse width when said measured value exceeds said command value to cause said valve member to close said port and open said bleed and thus increase said regulated pressure thereby causing said motor to move said element toward said projected position and said measured value to approach said command value, and for maintaining said pulse width to balance the magnetic bias on said valve member with the pressure bias on said valve member when said measured value equals said command value to cause said valve member to close both said port and said bleed and thus maintain constant said regulated pressure thereby causing said motor to hold said element stationary, whereby said valve member regulates said port and said bleed to form a regulated pressure causing said motor to move said element to the proper position established by said reference means.

* * * * *